July 31, 1928.
E. E. EINFELDT
1,679,023
TIRE MOUNTING FOR TRACTION WHEELS
Filed Jan. 4, 1927
2 Sheets-Sheet 1
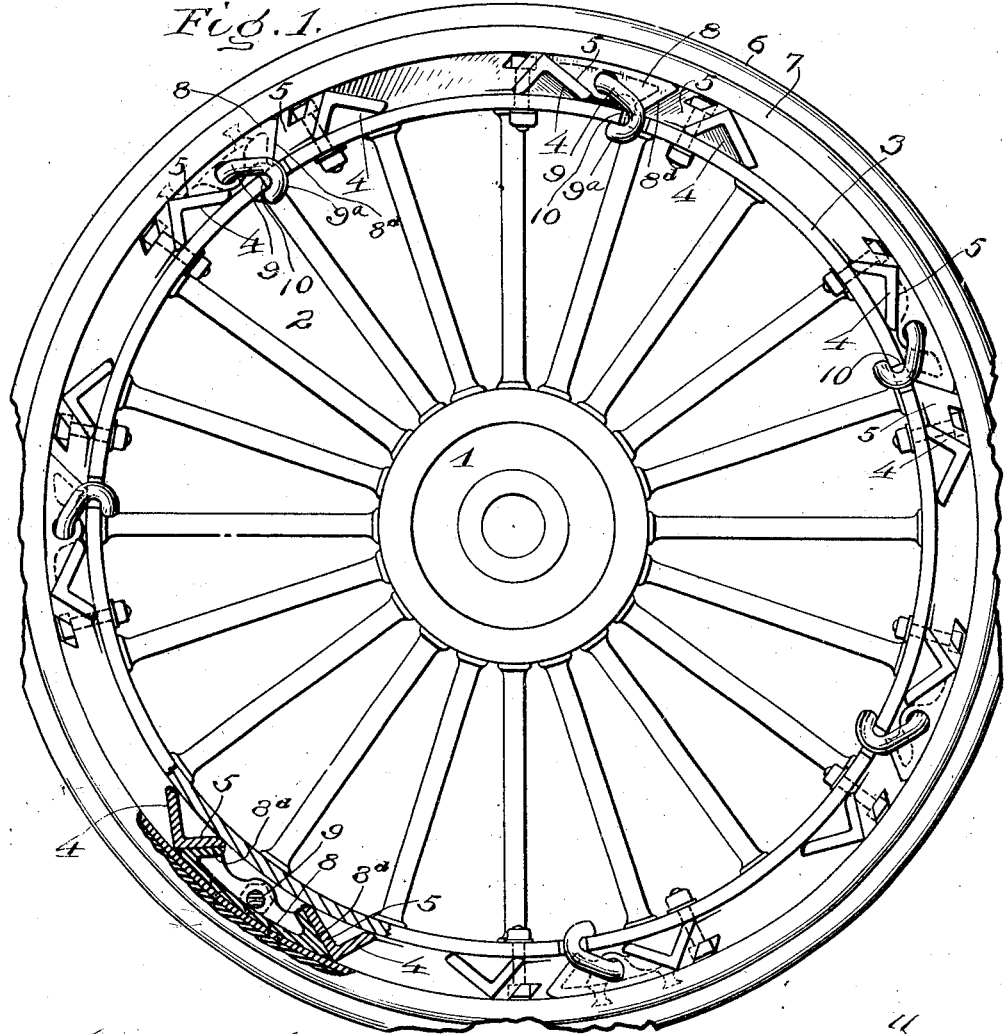
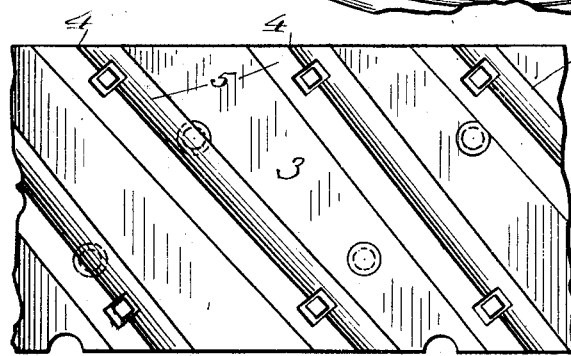
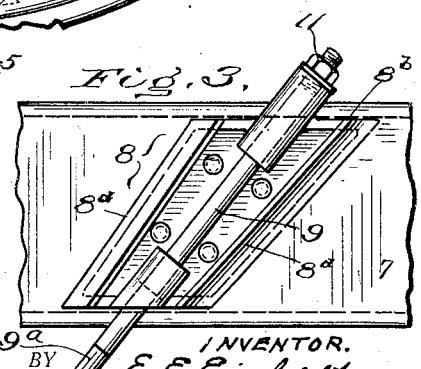

July 31, 1928.
E. E. EINFELDT
1,679,023
TIRE MOUNTING FOR TRACTION WHEELS
Filed Jan. 4, 1927          2 Sheets-Sheet 2
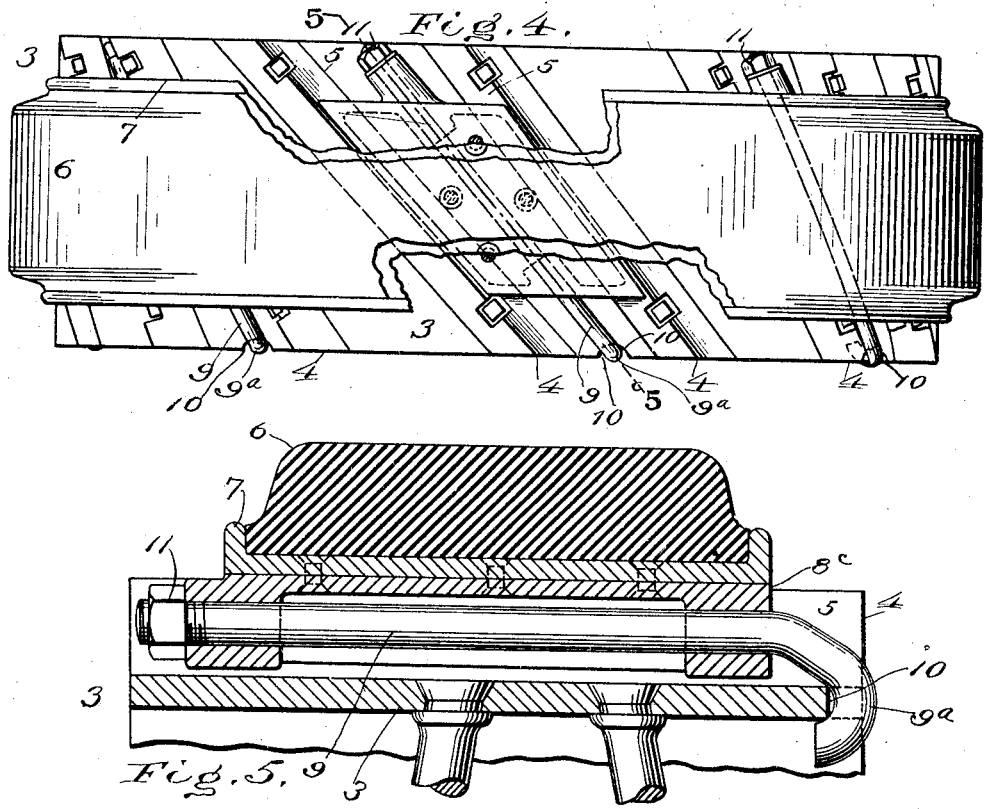
INVENTOR.
E. E. Einfeldt
BY Rogers, Bennock Campbell
ATTORNEYS Patented July 31, 1928.

1,679,023

UNITED STATES PATENT OFFICE.

ERNEST E. EINFELDT, OF DAVENPORT, IOWA, ASSIGNOR, BY MESNE ASSIGNMENTS, TO FRENCH & HECHT, INC., OF DAVENPORT, IOWA, A CORPORATION OF IOWA.

TIRE MOUNTING FOR TRACTION WHEELS.

Application filed January 4, 1927. Serial No. 158,840.

This invention relates to means for mounting a rubber or other tire having a relatively smooth face, on a traction wheel provided with traction cleats or similar tractive members, so that the vehicle, for instance a tractor, may be used either on soft ground where the traction cleats are effective, or on hard smooth roads or surfaces where the use of such cleats would injure the road, and is in many locations forbidden by law. To meet such different conditions, the present invention consists in an improved form and construction of a tire ring or base, which will adapt it to cooperate with the traction cleats or members in such manner that the tire may be conveniently applied to or removed from the wheel as desired, and when applied will be firmly held thereon without danger of looseness or displacement. In the specification to follow the improved construction will be described in detail, and the novel features thereof pointed out in the appended claims.

In the accompanying drawings:
Fig. 1 is a side elevation of a traction wheel and tire mounted thereon, the same having my invention embodied therein.

Fig. 2 is a plan view of a portion of the rim of the wheel showing the arrangement of the traction cleats to carry out my invention.

Fig. 3 is an inside face view of a portion of the tire ring or base showing the same formed to cooperate with the traction cleats on the rim.

Fig. 4 is a plan view of a wheel and attached tire, the latter being broken away to better illustrate the invention.

Fig. 5 is an axial section through the same on an enlarged scale on the line 5—5 of Figs. 1 and 4.

Fig. 6 is a perspective view of one of the wedging members on the tire ring.

Referring to the drawings:
The traction wheel shown as having my invention applied, comprises a hub 1, spokes 2, and rim 3, which latter has fixed to its peripheral face, traction members or cleats 4, in the present instance angular or V-shape in cross section and fixed to the rim with their apices facing outwardly. These cleats are, in the form of the invention shown, disposed obliquely on the wheel rim, and are arranged in pairs, with the cleats of each pair converging towards each other so that the distance between the cleats of a pair at one side of the wheel will be greater than that at the other side. The adjacent faces of the cleats of a pair thus constitute wedging surfaces 5, for the purpose presently to be described.

Surrounding the rim and covering the traction cleats thereon, is a detachable or removable tire, comprising in the present instance, a rubber tire proper 6, and a metal base or tire ring 7, to which the rubber tire is firmly attached.

In order to enable the tire to be applied and held on the rim without danger of looseness or displacement, and to be readily removed therefrom when desired, I apply to the inner side of the tire ring, wedging members 8, in number to correspond to the number of pairs of converging traction cleats, which wedging members 8 are adapted to fit and wedge in between the traction cleats and thus hold the tire in place on the rim. In the present instance there are seven pairs of traction cleats and seven wedging members, although of course there might be a greater or less number of these parts without departing from the limits of the invention.

These wedging members are, in the example of the invention illustrated, of the form best shown in Fig. 6, comprising each a slightly curved body portion 8ª to fit the inner curvature of the tire ring, side flanges 8ᵇ extending inwardly from the side edges of the body portion, and end flanges 8ᶜ extending inwardly from the ends of the body portion, the said members 8 being firmly fastened to the inner side of the tire ring and disposed obliquely thereof to correspond with the oblique disposition of the pairs of cleats, and firmly fastened to the tire ring, as for instance by rivets as shown, which extend through the said body portions and into the tire ring. The side flanges 8ᵇ converge towards each other lengthwise of the members and thereby form wedging surfaces 8ᵈ, which surfaces are adapted to cooperate with the wedging surfaces 5 of the traction cleats, the wedging members 8 being adapted to fit and wedge in respectively between the cleats of the pairs in the assemblage of the tire on the rim.

In order to hold the tire in place when assembled on the rim with the wedging members on the tire seated between the cleats on the rim, and in order to draw the parts into firm wedging engagement with each other, each of the wedging members on the tire ring is provided with a bolt 9 extending loosely through the end flanges 8ᶜ on the members 8 as best shown in Fig. 5. At one of their ends the bolts are formed with hooks 9ᵃ which extend inwardly so as to engage in notches 10 in the edge of the rim at points between the cleats of the several pairs, and at their other ends the bolts are threaded to receive tightening nuts 11 which bear against the outer sides of the flanges 8ᶜ at that end of the wedging members, so that by turning up the nuts, the wedging members will be forced axially between the wedging surfaces of the cleats and the tire thus caused to firmly seat on the rim without danger of accidental looseness or displacement.

In applying the tire to the rim, the fastening bolts, removed from the wedging members, are engaged at their hooked ends in the notches in the rim and extend between the cleats of the respective pairs. The tire is now positioned relatively to the rim so that the bolts will be received in the end flanges of the wedging members, and by a combined axial and circumferential motion, the tire is set in position around the rim so as to cover the traction cleats thereon. The nuts are now applied to the threaded ends of the bolts, and being screwed up, will, by bearing against the end flanges at that end of the wedging members, force the wedging members with a wedging effect to their final seat between the cleats, and thereby seat the tire firmly and tightly in position without danger of displacement, either axially or circumferentially. In detaching the tire, the nuts are first removed from the bolts, the tire forced axially off the rim, and finally the hooked bolts disengaged from the rim.

From the construction described it will be understood that the tire may be readily and conveniently applied to the rim or removed therefrom as desired, according to the conditions encountered in practice, the relation of the parts being such that with the tire ring assembled on the rim, and with the wedging surfaces in contact, the inner surface of the tire ring will seat on and receive support from the apices of the traction cleats; whereby the tire will receive firm and solid support from the cleats; and by reason of the interengaging of the wedging members and cleats as described, the tire will be effectually prevented from circumferential movement relative to the rim. At the same time, and by reason of the engagement of the fastening bolts with the rim and wedging members on the tire, the latter will be effectually prevented from axial looseness or displacement.

While in the foregoing description and accompanying drawings I have set forth the invention in the particular detailed form and arrangement of parts which I prefer to adopt, it will be understood that these details may be variously modified without departing from the limits of the invention; and further it will be understood that the invention is not limited to any particular form or construction of the parts, except in so far as such limitations are specified in the claims.

Having thus described my invention, what I claim is:

1. In combination with a wheel rim, traction members thereon having their sides inclined to form wedging surfaces, a tire ring adapted to surround said rim and cover the traction members, wedging members on the tire ring in position to cooperate with the inclined sides of the traction members in wedging the tire on the rim, and releaseable means cooperating respectively with the rim and tire and serving to hold the tire detachably in place on the rim.

2. In combination with a wheel rim, pairs of traction cleats thereon, the cleats of a pair converging towards each other, a tire ring adapted to surround the rim and cover said traction cleats, members on the inner side of the tire ring formed with converging sides to fit between the converging traction cleats, and means cooperating respectively with the rim and tire to hold the tire in place.

3. In combination with a wheel rim, traction members thereon, a tire ring adapted to surround the wheel rim and cover the traction members, wedging members on the tire ring in position to cooperate with the sides of the traction members in wedging the tire on the rim, and bolts engaging respectively with the edge of the rim and with said wedging members and serving to hold the parts detachably in their assembled relations.

4. In combination with a wheel rim, traction members thereon, a tire ring adapted to surround the rim and cover the traction members, members on the inner side of the tire ring in position to fit in between the traction members, said traction members and the members on the inner side of the tire ring being formed with cooperating wedging surfaces, bolts carried by the members on the tire ring and engaged at one of their ends with the rim, and nuts screwed on the opposite end of the bolts and acting on said members on the tire ring.

5. In combination with a wheel rim, traction cleats thereon converging toward each other to form side wedging surfaces, a tire ring surrounding said rim and covering the traction cleats, wedging members on the tire ring formed with converging sides to cooperate with the side wedging surfaces of the traction cleats in wedging the tire ring on the rim, fastening bolts carried by the wedging members and engaged at one end with the edge of the rim at that side, and nuts on the opposite ends of the bolts engaging the wedging members at that side.

In testimony whereof, I have affixed my signature hereto.

ERNEST E. EINFELDT.